(12) United States Patent
Lee et al.

(10) Patent No.: US 9,143,811 B2
(45) Date of Patent: Sep. 22, 2015

(54) SYSTEM AND METHOD FOR PROVIDING CLOUD GAME SERVICE

(75) Inventors: Ki-Hoon Lee, Seongnam-si (KR); I-Gil Kim, Suwon-si (KR); Gyu-Tae Baek, Seoul (KR)

(73) Assignee: KT Corporation, Seongnam (KR)

( * ) Notice: Subject to any disclaimer, the term of this patent is extended or adjusted under 35 U.S.C. 154(b) by 275 days.

(21) Appl. No.: 13/555,689

(22) Filed: Jul. 23, 2012

(65) Prior Publication Data

US 2013/0023340 A1    Jan. 24, 2013

(30) Foreign Application Priority Data

Jul. 21, 2011    (KR) .................. 10-2011-0072590

(51) Int. Cl.
| A63F 9/24 | (2006.01) |
| A63F 13/00 | (2014.01) |
| G06F 17/00 | (2006.01) |
| G06F 19/00 | (2011.01) |
| H04N 21/2343 | (2011.01) |
| A63F 13/30 | (2014.01) |
| H04N 21/478 | (2011.01) |
| H04N 21/258 | (2011.01) |
| H04N 21/418 | (2011.01) |
| H04N 21/426 | (2011.01) |
| H04N 21/6587 | (2011.01) |

(52) U.S. Cl.
CPC ........ *H04N 21/234363* (2013.01); *A63F 13/12* (2013.01); *H04N 21/258* (2013.01); *H04N 21/25891* (2013.01); *H04N 21/4182* (2013.01); *H04N 21/42684* (2013.01); *H04N 21/4781* (2013.01); *H04N 21/6587* (2013.01); *A63F 2300/535* (2013.01); *A63F 2300/538* (2013.01); *A63F 2300/5546* (2013.01)

(58) Field of Classification Search
USPC ............. 463/30, 39, 40, 41, 42; 709/201, 223
See application file for complete search history.

(56) References Cited

U.S. PATENT DOCUMENTS

| 2001/0052008 | A1* | 12/2001 | Jacobus | ........................ 709/223 |
| 2010/0304860 | A1* | 12/2010 | Gault et al. | ..................... 463/31 |
| 2012/0096368 | A1* | 4/2012 | McDowell | ..................... 715/748 |

FOREIGN PATENT DOCUMENTS

| KR | 20070061242 A | 6/2007 |
| KR | 20100092689 A | 8/2010 |

OTHER PUBLICATIONS

Lim et al., "Technology Trends of Cloud Computing-based Game Streaming", ETRI, vol. 26, No. 1, pp. 47-56, Feb. 15, 2011.

\* cited by examiner

*Primary Examiner* — Adetokunbo O Torimiro
(74) *Attorney, Agent, or Firm* — Sughrue Mion, PLLC

(57) ABSTRACT

A cloud game service providing apparatus includes an input reception unit configured to receive an input signal from a device from among at least one user device; a game execution unit configured to execute a cloud game in response to the received input signal; and a virtual graphic processing unit configured to encode a frame of the executed cloud game by using a virtual graphic resource, and to provide the encoded frame of the executed cloud game to the user device.

10 Claims, 4 Drawing Sheets

| USER ID | DEVICE ID |
|---------|-----------|
| U1 | {D1, D2, D3} |
| U2 | {D2, D4} |
| ⋮ | ⋮ |

| DEVICE ID | RESOLUTION | VIDEO CODEC |
|-----------|------------|-------------|
| D1 | 640×480 | MPEG-2 |
| D2 | 1280×720 | H.264 |
| D3 | 640×480 | MPEG-2 |
| ⋮ | ⋮ | ⋮ |

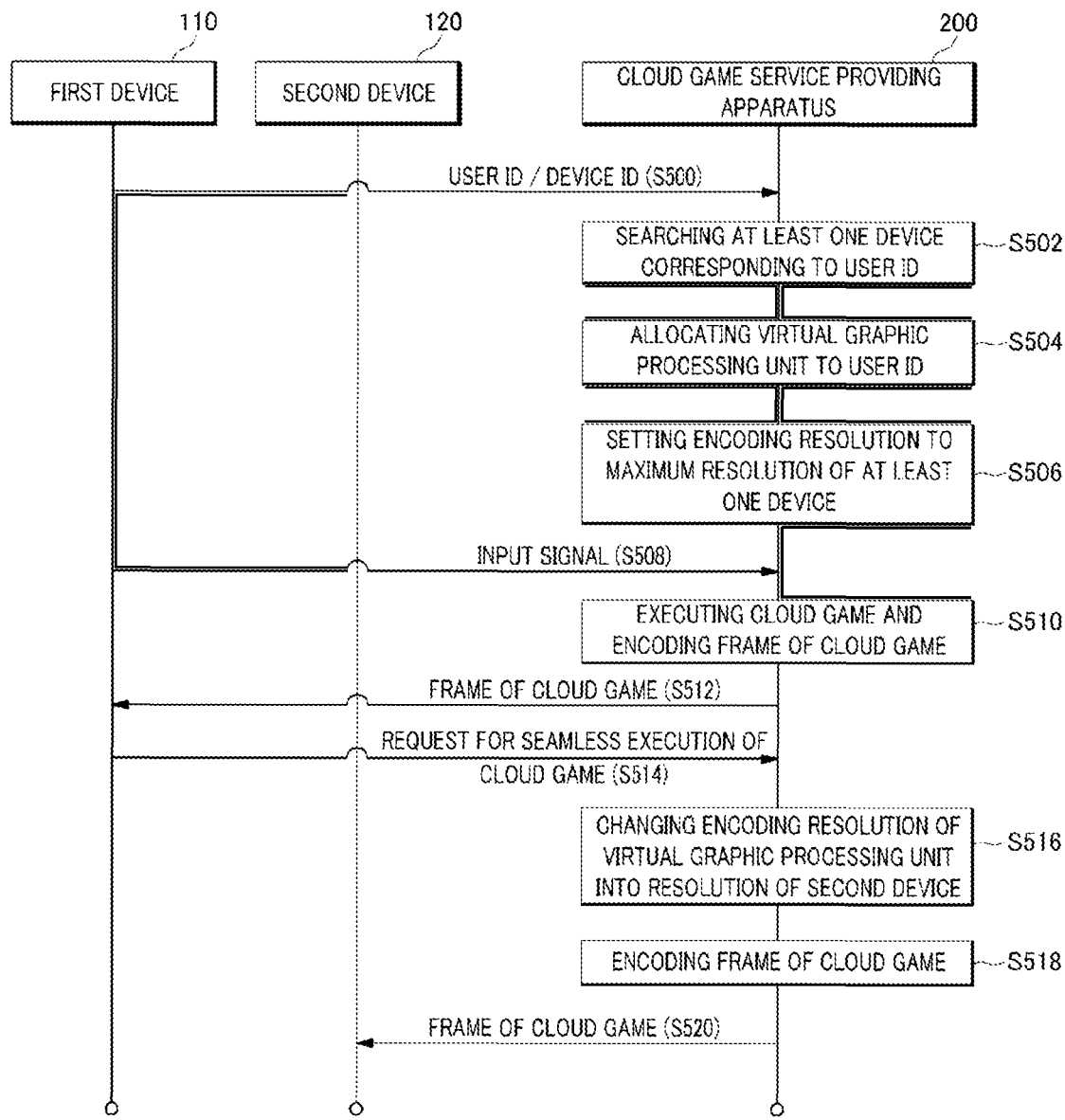

SYSTEM AND METHOD FOR PROVIDING CLOUD GAME SERVICE

CROSS-REFERENCE TO RELATED APPLICATION

This application claims priority from Korean Patent Application No. 10-2011-0072590, filed on Jul. 21, 2011 in the Korean Intellectual Property Office, the disclosure of which is incorporated herein by reference in its entirety.

BACKGROUND

1. Field

Exemplary embodiments broadly relate to a system and a method for providing a cloud game service, and more particularly, exemplary embodiments relate to a system and a method for providing a cloud game service by using a virtual graphic processing unit allocated to each of a plurality of users.

2. Description of the Related Art

With the recent development of computer related information communication technologies, the game industry has been rapidly advancing. In a related art, most parts of computer games include arcade or video games with simple synopsis. However, with recent development of multimedia technologies and network technologies, games in totally different dimensions from those of existing games have been developed one after another. In particular, the proliferation of the high-speed Internet and the wireless Internet has created a new game field, i.e., multi-user on-line games, thereby intensifying the groundbreaking development of the game industry.

There is increasing attention being paid to a technology for providing a cloud game service in a streaming manner to a multiplicity of devices that provide computing and networking functions.

SUMMARY

Accordingly, it is an aspect to provide a system and a method for providing a cloud game service, by which the system and the method are capable of allocating a virtual graphic processing unit for encoding a frame of a cloud game to each of a plurality of users, and thereby, effectively utilizing a resource of an apparatus.

Another aspect is to provide a system and a method capable of initializing an encoding resolution of a virtual graphic processing unit to a maximum resolution of at least one user device.

Another aspect is to provide a system and a method for providing a cloud game service, in which in response to a request for seamless execution of a cloud game from a first user device to a second user device, an encoding resolution of a virtual graphic processing unit can be effectively changed to be in compliance with a resolution of the second device.

According to an aspect of exemplary embodiments, there is provided an apparatus for providing a cloud game service. The apparatus includes an input reception unit which receives an input signal from a first device from among at least one user device, a game execution unit which executes a cloud game in response to the received input signal, and a virtual graphic processing unit which encodes a frame of the executed cloud game by using a virtual graphic resource, and which provides the encoded frame of the executed cloud game to the first device.

According to another aspect of exemplary embodiments, there is provided a method for providing a cloud game service. The method includes receiving a user identification from a first user device, searching for at least one device corresponding to the received user identification, allocating a virtual graphic processing unit to the received user identification, receiving an input signal relating to execution of a cloud game from the first user device, encoding a frame of the cloud game by using the virtual graphic processing unit, and providing the encoded frame of the cloud game to the first user device.

According to another aspect of exemplary embodiments, there is provided a method for providing a cloud game service. The method includes allocating a virtual graphic processing unit to each of a plurality of users, searching for at least one device that corresponds to each of the plurality of users, receiving, from a first user device of the at least one device, a request for execution of a cloud game in a second user device of the at least one device, changing an encoding resolution of the virtual graphic processing unit into a resolution of the second user device and encoding a frame of the cloud game by using the changed resolution, and providing the encoded frame of the cloud game to the second user device.

In exemplary embodiments, it is possible to provide a cloud game service to a multiplicity of user devices by allocating a virtual graphic processing unit for encoding a cloud game to each of the users, and thereby, by effectively using a resource of an apparatus.

Further, in response to a request for seamless execution of a game from a first user device to a second user device, it is possible to effectively change an encoding resolution of a virtual graphic processing unit without rebooting the virtual graphic processing unit, by initializing an encoding resolution of the virtual graphic processing unit to a resolution of a maximum resolution of at least one device of one user.

BRIEF DESCRIPTION OF THE DRAWINGS

Non-limiting and non-exhaustive exemplary embodiments will be described in conjunction with the accompanying drawings. Understanding that these drawings depict only exemplary embodiments and are, therefore, not intended to limit its scope, the exemplary embodiments will be described with specificity and detail taken in conjunction with the accompanying drawings, in which:

FIG. 5 is a flow diagram illustrating a method for providing a cloud game service, according to an exemplary embodiment.

DETAILED DESCRIPTION OF EXEMPLARY EMBODIMENTS

Figure 1:
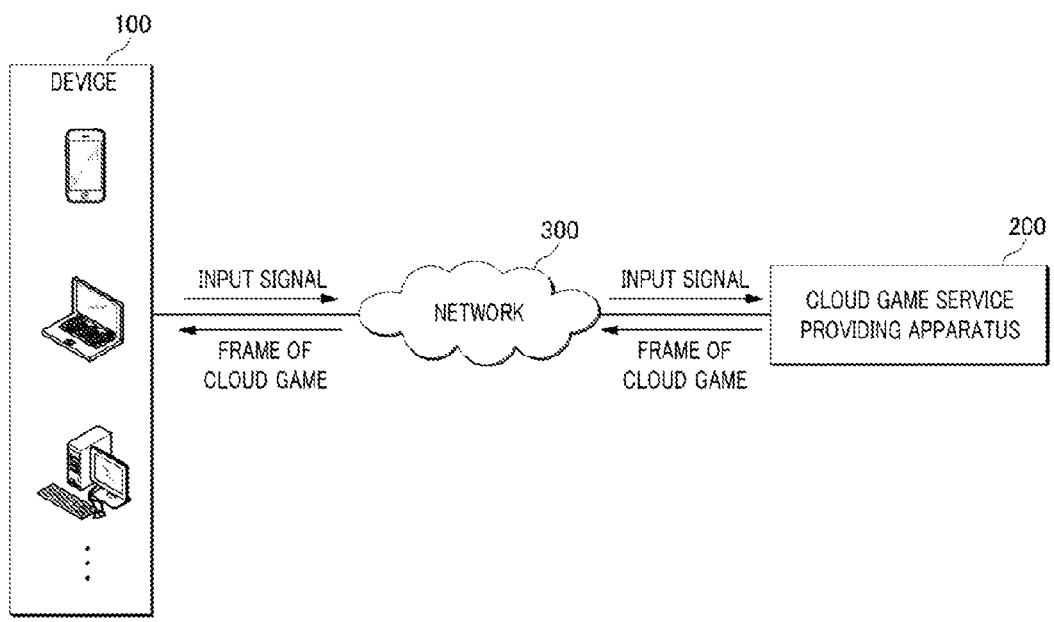
FIG. 1 is a view illustrating a configuration of a system for providing a cloud game service, according to an exemplary embodiment.

Hereinafter, exemplary embodiments will be described in detail with reference to the accompanying drawings to be readily implemented by those skilled in the art. However, it is to be noted that the present disclosure is not limited to the exemplary embodiments, but can be realized in various other ways. In the drawings, certain parts not directly relevant to the description of exemplary embodiments are omitted to enhance the clarity of the drawings, and like reference numerals denote like parts throughout the whole document.

Throughout the whole document, the terms "connected to" or "coupled to" are used to designate a connection or coupling of one element to another element, and include both a case where an element is "directly connected or coupled to" another element and a case where an element is "electronically connected or coupled to" another element via still another element. Further, each of the terms "comprises," "includes," "comprising," and "including," as used in the present disclosure, is defined such that one or more other components, steps, operations, and/or the existence or addition of elements are not excluded in addition to the described components, steps, operations and/or elements.

Throughout the whole document, the term "cloud game service" refers to a game service provided from an apparatus, such as a server, to a user device, e.g., a service for receiving an input signal relating to execution of a game by using a device, and executing a game based on the received input signal, and thereafter, providing the game to the device.

Hereinafter, exemplary embodiments will be explained in detail with reference to the accompanying drawings.

FIG. 1 is a view illustrating a configuration of system for providing a cloud game service, according to an exemplary embodiment.

As illustrated in FIG. 1, a system for providing a cloud game service includes a plurality of devices 100, a cloud game service providing apparatus 200, and a network 300.

Each of the plurality of devices 100 is connected to the cloud game service providing apparatus 200 via the network 300. One device from among the plurality of devices 100 may provide an input signal relating to an execution of the cloud game to the cloud game service providing apparatus 200. At least one device 100 may receive an encoded frame, including sound or image data relating to the cloud game executed in the cloud game service providing apparatus 200, in response to the input signal, from the cloud game service providing apparatus 200. The at least one device 100 decodes the encoded frame received from the cloud game service providing apparatus 200.

While a user is being provided with the cloud game service via the at least one user device 100, the user may provide a request for a seamless execution the cloud game by using a second device 100.

The cloud game service providing apparatus 200 provides the cloud game service to at least one device 100. The cloud game service providing apparatus 200 may provide an image of the cloud game which is optimized for each of the devices 100 based on individual device characteristics, including a resolution of the each of the devices 100.

The cloud game service providing apparatus 200 may allocate a virtual graphic processing unit to each of a plurality of users. The virtual graphic processing unit allocated to a user may more effectively provide the cloud game to at least one user device 100, by using information relating to all of the devices 100 of the user.

The network 300 may include, for example, at least one of a private line, a local area network (LAN), a wide area network (WAN), an Intranet, a private telephone network, a public telephone network, a public switched telephone network (PSTN), and/or a combination thereof. The network 300 refers to a comprehensive data communication network for enabling each of components illustrated in FIG. 1 to communicate with one another, and the network 300 may include, for example, at least one of wired Internet, wireless Internet, and a mobile radio communication network.

Hereinafter, detailed configuration of the cloud game service providing apparatus 200 will be described with reference to FIG. 2.

Figure 2:
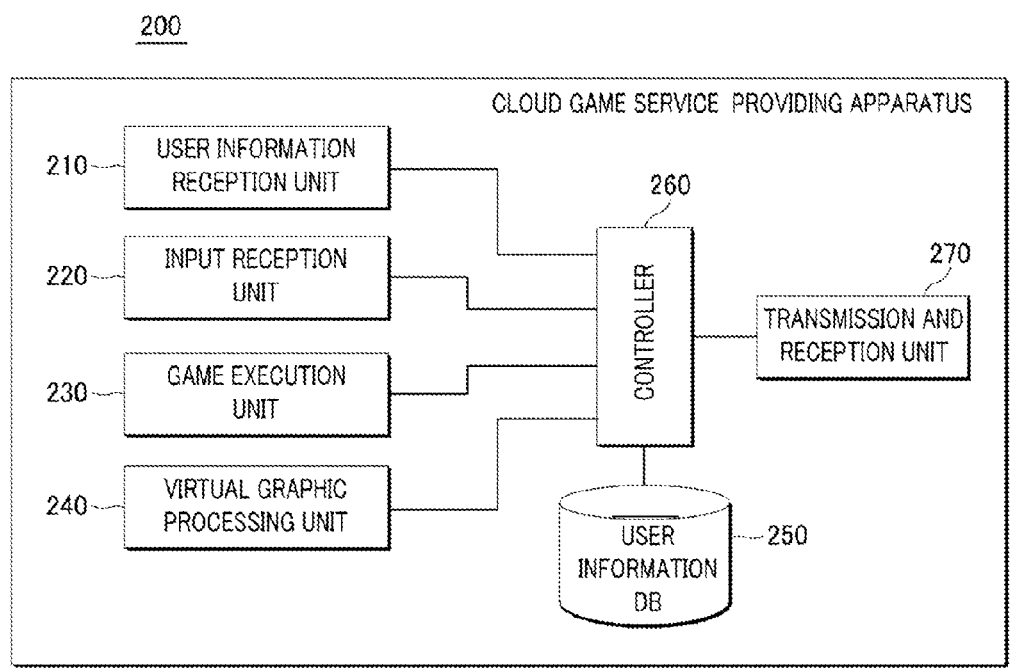
FIG. 2 is a block diagram illustrating an apparatus for providing a cloud game service, according to an exemplary embodiment.

FIG. 2 is a block diagram illustrating an apparatus for providing a cloud game service, according to an exemplary embodiment. The cloud game service providing apparatus 200 includes a user information reception unit 210, an input reception unit 220, a game execution unit 230, a virtual graphic processing unit 240, a user information database (DB) 250, a controller 260, and a transmission and reception unit 270.

The user information reception unit 210 receives information relating to users and devices from the devices 100. The user information reception unit 210 may further receive a user identification (ID), a device ID, and specification information corresponding to the device ID. The user information reception unit 210 may be embodied as a hardware component, or as a software module, or as a combination of hardware and software.

The input reception unit 220 receives an input signal relating to executing a cloud game from at least one device from among the plurality of devices 100. The input reception unit 220 may be embodied as a hardware component, or as a software module, or as a combination of hardware and software.

The game execution unit 230 executes a cloud game based on the input signal received from the device 100. The game execution unit 230 analyzes the input signal received from the device 100 to use the input signal for executing the cloud game. The game execution unit 230 may be embodied as a hardware component, or as a software module, or as a combination of hardware and software.

The virtual graphic processing unit 240 encodes a frame of the executed cloud game by using a virtual graphic resource, and provides the encoded frame to the device 100.

The virtual graphic processing unit 240 may be allocated to each of a plurality of users. The virtual graphic processing unit 240 may encode a game image or sound, of the executed cloud game, in a manner which is suitable for at least one device 100 of each of the users, and provide the encoded image and sound to the at least one device 100 of each of the users.

The virtual graphic processing unit 240 may search for at least one device corresponding to the user ID received from a device 100, and set an encoding resolution to a maximum resolution of the at least one device 100 of the user as an initial encoding resolution, in order to encode the frame. The virtual graphic processing unit 240 may encode a game image to be in compliance with the respective specification of each of the devices 100 based on the corresponding device IDs of the devices 100, on which a cloud game is attempted to be displayed.

With respect to the graphic processing unit 240 according to an exemplary embodiment, even when a user wants to swap one device for another device of the user to seamlessly execute a cloud game thereon during execution of the cloud game, the encoding resolution of the cloud game can be effectively changed without rebooting the virtual graphic processing unit 240.

The virtual graphic processing unit 240 may include, for example, one or more of an encoder, a virtual graphic card, and a virtual audio card, or any other suitable hardware component, such as an integrated circuit, dedicated circuitry, or a preprogrammed microprocessor, or as a software module which contains a program which is configured to perform one or more functions. However, the function of the per-user virtual graphic processing unit 240 is not limited thereto.

The user information database (DB) 250 stores information relating to users and information relating to each of the plurality of devices 100. The user information database (DB) 250 may store information relating to at least one device of each of the users, and the information may be stored on a user-by-user basis. In order to prevent storage of overlapping device information, the user information database (DB) 250 may discriminate and store a user information table for storing user information and a device information table for storing device information. The user information database (DB) 250 may further store a user ID, a device ID and specification information corresponding to the device ID. Examples of the user information table and the device information table will be described with reference to FIGS. 3 and 4. The user information database 250 may be embodied as a memory, such as, for example, a random-access memory (RAM), a read-only memory (ROM), a compact disk ROM (CD-ROM), or as any other suitable type of memory.

The controller 260 allocates the virtual graphic processing unit 240 to each of the plurality of users, and executes a cloud game based on an input signal received from a first user device from among at least one user device, and controls the user information reception unit 210, the input reception unit 220, the game execution unit 230, the virtual graphic processing unit 240, the user information database (DB) 250, and the transmission and reception unit 270, which will be described below, to effectively encode a frame to provide the encoded frame to the first user device. The controller 260 may be embodied as an integrated circuit, dedicated circuitry, firmware, a microprocessor chip, or any other suitable type of hardware component, or as a software module which includes one or more programs which are configured to perform one or more control functions.

The transmission and reception unit 270 transmits and receives information in order to provide the cloud game service to each of the plurality of devices 100. The transmission and reception unit 270 may include a transmitter, a receiver, a transceiver, or any other suitable type of hardware component which is capable of electronic communication, or as a software module which includes one or more programs which are configured to perform one or more communication-related functions.

Hereinafter, an example of the user information table stored in the user information database (DB) 250 according to an exemplary embodiment will be described with reference to FIG. 3.

Figure 3:
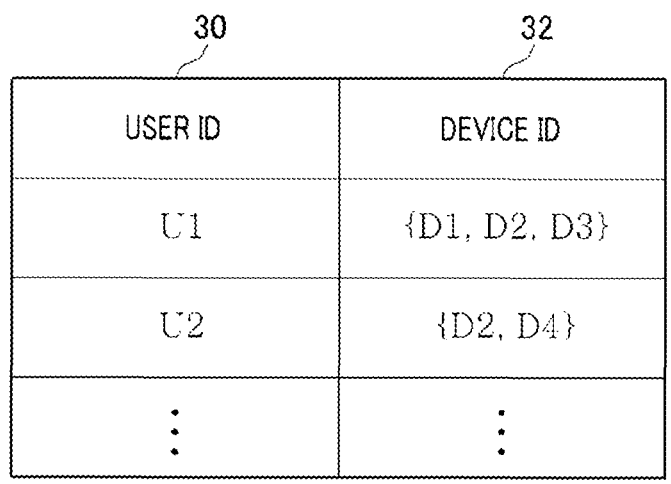
FIG. 3 is an example of a user information table, according to an exemplary embodiment.

FIG. 3 is an example of a user information table, according to an exemplary embodiment.

As illustrated in FIG. 3, the user information table, according to an exemplary embodiment, includes a user ID field 30 and a device ID field 32. The user ID field 30 may record identification values for each of a plurality of users. The device ID field 32 may record identification values for each of the plurality of devices 100 corresponding to each of the user IDs, in conjunction with the corresponding user ID itself.

Figure 4:
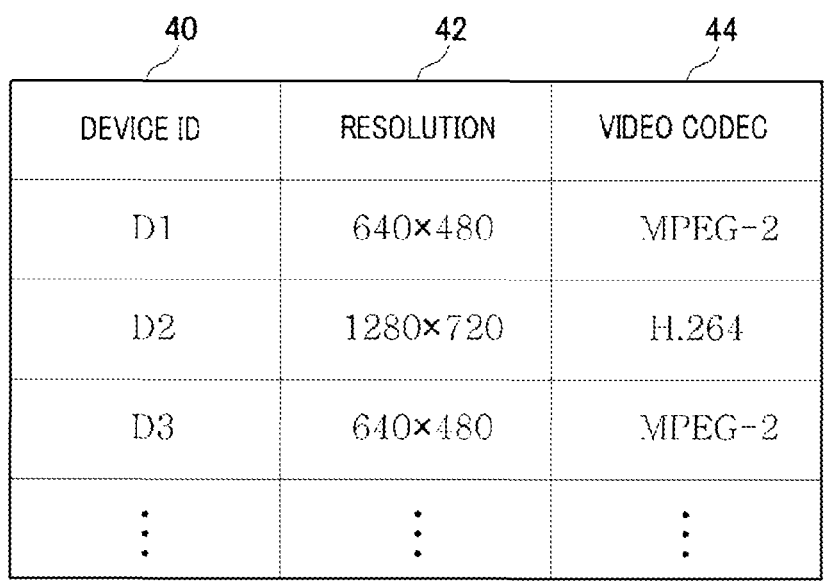
FIG. 4 is an example of a device user information table, according to an exemplary embodiment.

Hereinafter, an example of the device information table stored in the user information database (DB) 250 according to an exemplary embodiment will be described with reference to FIG. 4. FIG. 4 is an example of a device user information table, according to an exemplary embodiment.

As illustrated in FIG. 4, the device information table, according to an exemplary embodiment, may include a device ID field 40, a resolution field 42, and a video codec field 44. The device ID field may record identification values for each of the plurality of devices 100. The resolution field 42 may record resolution values for each of the plurality of devices 100 corresponding to each of the device IDs, in conjunction with the corresponding device IDs. The video codec field 44 may record information relating to a video codec supported in each of the plurality of devices 100, in conjunction with the corresponding device IDs.

The user information table in FIG. 3 and the device information table in FIG. 4 may be discriminated and stored in the user information database (DB) 250. Based on the information stored in the database 250, the virtual graphic processing unit 240 may set an encoding resolution, for example, to a maximum resolution of the at least one device of the user, as an initial encoding resolution.

For example, the virtual graphic processing unit 240 allocated to a user U1 may set an encoding resolution to 1280× 720, which is a maximum resolution from among resolutions of devices D1, D2, and D3 of the user U1, as an initial encoding resolution. Further, the virtual graphic processing unit 240 may encode the cloud game by using a video codec corresponding to the selected resolution.

Accordingly, by using the system for providing a cloud game service according to an exemplary embodiment, it is possible to more economically provide the cloud game service to users by effectively using the resource of the apparatus, as well as seamlessly providing the game service in a manner which is optimized for each of the users.

Hereinafter, a method for providing a cloud game service according to an exemplary embodiment will be described with reference to FIG. 5.

FIG. 5 is a flow diagram illustrating a method for providing a cloud game service, according to an exemplary embodiment. In FIG. 5, a first device 110 and a second device 120 may be retained by the same user.

In operation S500, the cloud game service providing apparatus 200 receives a user ID and a device ID from the first device 110. The cloud game service providing apparatus 200 may receive the user ID and the device ID from the first device 110 when the first device 110 is connected to the cloud game service providing apparatus 200.

In operation S502, the cloud game service providing apparatus 200 may analyze the user ID and the device ID received from the first device 110, and search for at least one device which corresponds to the user ID received from the first device 110.

In operation S504, the cloud game service providing apparatus 200 allocates a virtual graphic processing unit, based on the received user ID. The virtual graphic processing unit may be allocated to each of the users.

In operation S506, the cloud game service providing apparatus 200 sets an encoding resolution of the virtual graphic processing unit to a maximum resolution of the at least one device corresponding to the user ID received from the first device 110. The encoding resolution of the virtual graphic processing unit may be initially set to the maximum resolution.

In operation S508, the cloud game service providing apparatus 200 receives an input signal relating to executing the cloud game from the first device 110.

In operation S510, the cloud game service providing apparatus 200 executes the cloud game based on the received input signal. Further, the virtual graphic processing unit allocated to each of the users may encode a frame, which may include, for example, sound or image data relating to the cloud game, in compliance with the encoding resolution set in operation S506. The cloud game service providing apparatus 200 may encode the frame based on the encoding resolution and the video codec of a device which has a resolution that corresponds to the set encoding resolution. Further, the cloud game service providing apparatus 200 may change the encoding resolution of the virtual graphic processing unit into a resolution of the first device 110.

In operation S512, the cloud game service providing apparatus 200 provides the encoded frame of the cloud game to the first device 110.

In operation S514, if either or both of the user of the first device 110 and the user of the second device 120 want to execute the cloud game on the second device 120, the cloud game service providing apparatus 200 may receive from the first device 110 a request for seamless execution of the cloud game on the second device 120.

In operation S516, the cloud game service providing apparatus 200 may identify the specification of the second device 120, and change the encoding resolution of the virtual graphic processing unit into a resolution of the second device 120.

In operation S518, the cloud game service providing apparatus 200 encodes the frame of the executed cloud game based on the changed encoding resolution. The cloud game service providing apparatus 200 may execute the cloud game in response to the input signal from the second device 120.

In operation S520, the cloud game service providing apparatus 200 provides a frame of the cloud game, encoded in operation S518, to the second device 120.

The exemplary embodiments may be embodied in a transitory or non-transitory storage medium which includes instruction codes which are executable by a computer or processor, such as a program module which is executable by the computer or processor. A data structure in accordance with the exemplary embodiments may be stored in the storage medium and executable by the computer or processor. A computer-readable medium may be any usable medium which can be accessed by the computer and includes all volatile and/or non-volatile and removable and/or non-removable media. Further, the computer-readable medium may include any or all computer storage and communication media. The computer storage medium may include any or all volatile/non-volatile and removable/non-removable media embodied by a certain method or technology for storing information such as, for example, computer-readable instruction code, a data structure, a program module, or other data. The communication medium may include the computer-readable instruction code, the data structure, the program module, or other data of a modulated data signal such as a carrier wave, or other transmission mechanism, and includes information transmission mediums.

The above description of the exemplary embodiments is provided for the purpose of illustration, and it will be understood by those skilled in the art that various changes and modifications may be made without changing a technical conception and/or any essential features of the exemplary embodiments. Thus, the above-described exemplary embodiments are exemplary in all aspects, and do not limit the present disclosure. For example, each component described to be of a single type can be implemented in a distributed manner. Likewise, components described to be distributed can be implemented in a combined manner.

The scope of the present inventive concept is defined by the following claims and their equivalents rather than by the detailed description of the exemplary embodiments. It shall be understood that all modifications and embodiments conceived from the meaning and scope of the claims and their equivalents are included in the scope of the present inventive concept.

What is claimed is:

1. An apparatus for providing a cloud game service, the apparatus comprising:
   an input reception unit which receives an input signal from a first device from among at least one user device;
   a game execution unit which executes a cloud game in response to the received input signal; and
   a virtual graphic processing unit which encodes a frame of the executed cloud game by using a virtual graphic resource, and which provides the encoded frame of the executed cloud game to the first device,
   wherein the input reception unit receives, from the first device, a request for execution of the cloud game on a second device from among the at least one user device,
   wherein the virtual graphic processing unit is configured to change an encoding resolution into a resolution of the second device in response to the received request for execution of the cloud game, and
   wherein upon receipt of the request for execution of the cloud game, the game execution unit stops execution of the cloud game on the first device and seamlessly start execution of the cloud game on the second device upon receipt of an input signal from the second device.

2. The apparatus of claim 1, wherein the virtual graphic processing unit sets the encoding resolution, for encoding the frame, to a maximum resolution of the at least one user device.

3. The apparatus of claim 2, further comprising:
   a user information reception unit which receives a user identification from the first device; and
   a user information database which stores information relating to the at least one user device,
   wherein the virtual graphic processing unit encodes the frame of the executed cloud game based on the received user identification.

4. The apparatus of claim 3, wherein the user information database stores the user identification, at least one device identification corresponding to the user identification, and specification information relating to each of the at least one device identification.

5. The apparatus of claim 1, wherein the virtual graphic processing unit includes at least one from among an encoder, a virtual graphic card, and a virtual sound card.

6. A method for providing a cloud game service, the method comprising:
   receiving a user identification from a first user device;
   searching for at least one device corresponding to the received user identification;
   allocating a virtual graphic processing unit to the received user identification;
   receiving an input signal relating to an execution of a cloud game from the first user device;
   encoding a frame of the cloud game by using the virtual graphic processing unit; and
   providing the encoded frame of the cloud game to the first user device,
   wherein the method further comprises:
   receiving, from the first user device, a request for execution of the cloud game in a second user device;
   changing an encoding resolution into a resolution of the second user device in response to receiving the request for execution of the cloud game; and
   upon receiving the request for execution of the cloud game, stopping execution of the cloud game on the first device and seamlessly starting execution of the cloud game on the second device upon receipt of an input signal from the second device.

7. The method of claim 6, wherein the virtual graphic processing unit sets the encoding resolution of the encoded frame to a maximum resolution of the at least one device.

8. The method of claim 6 further comprising:
   storing the received user identification, at least one device identification corresponding to the stored user identification, and specification information relating to each of the at least one device identification.

9. A method for providing a cloud game service, the method comprising:
   allocating a virtual graphic processing unit to each of a plurality of users;
   searching for at least one device that corresponds to each of the plurality of users;
   receiving, from a first user device of the at least one device, a request for execution of a cloud game in a second user device of the at least one device;
   changing an encoding resolution of the virtual graphic processing unit into a resolution of the second user device and encoding a frame of the cloud game in response to receiving the request, by using the changed resolution;
   providing the encoded frame of the cloud game to the second user device; and
   upon receiving the request for execution of the cloud game, stopping execution of the cloud game on the first device and seamlessly starting execution of the cloud game on the second device upon receipt of an input signal from the second user device.

10. The method of claim 9, wherein the virtual graphic processing unit sets the encoding resolution of the encoded frame to a maximum resolution of the at least one device.

* * * * *